Feb. 6, 1923.

T. K. BYRD.
GLASS SHEARING MECHANISM.
FILED MAY 2, 1921.

T. K. BYRD.
GLASS SHEARING MECHANISM.
FILED MAY 2, 1921.

T. K. BYRD.
GLASS SHEARING MECHANISM
FILED MAY 2, 1921.

1,444,327.

Patented Feb. 6, 1923.

1,444,327

UNITED STATES PATENT OFFICE.

THEODORE K. BYRD, OF BALTIMORE, MARYLAND.

GLASS-SHEARING MECHANISM.

Application filed May 2, 1921. Serial No. 466,014.

*To all whom it may concern:*

Be it known that I, THEODORE K. BYRD, a citizen of the United States, residing at Baltimore, in the county of Baltimore City and State of Maryland, have invented certain new and useful Improvements in Glass-Shearing Mechanism; and I do hereby declare the following to be a full, clear, and exact description of the invention, such as will enable others skilled in the art to which it appertains to make and use the same.

This invention relates to improvements in glass shearing, and more particularly stated contemplates the production of means for effectively severing the glass blank or pattern from a string or neck of glass.

In the production of glass ware, wherein a machine is provided of the "Owens" type for example, having a plurality of dipping heads for gathering the molten glass from a tank, it frequently happens that an unsightly shear mark or scar is found upon the product and in many instances to such an extent as to render the article unsalable. At present it is customary to provide a knife, the shearing edge of which cooperates with the bottom of the blank mold to sever the glass, drawn up into the mold from the string or neck lifted from the molten mass in the tank. This construction has been found to be highly objectionable in that the knife frequently strikes the bottom of the mold and in a very short time the glass is more nearly chewed off as if struck by a dull instrument, than cleanly severed. It is now necessary to sharpen the blank molds at frequent intervals by removing and turning them in a lathe. This operation is both tedious and unsatisfactory in that a large amount of time is lost, and in addition the mold blanks are shortened, thereby reducing the length of the pattern and the resulting product.

It is an object of the present invention to overcome these experienced difficulties and produce a shearing mechanism operable immediately beneath and independent of the bottom face of the blank mold, thereby increasing the longevity of use of said mold, and eliminating the shear mark or scar.

Another object of the invention is the production of cooperating shearing members, one of said members constituting a shearing blade, and the other of said members forming a shear plate against which the former member operates to sever the glass, said shear plate being interposed between the bottom of the blank mold and the aforesaid shearing member.

A further object of this invention is to provide a glass shearing mechanism consisting of complementary shearing members interconnected with the dipping head and controlled by the operation of the machine.

With these and other objects in view the invention further consists in the arrangement and construction of the several parts hereinafter described and pointed out in the appended claims.

In the accompanying drawings wherein is illustrated an embodiment of my invention as applied to the dipping head of an "Owens bottle machine,"

Referring to the drawings in which similar reference characters designate corresponding parts in the several views, the invention comprises among other things a dipping head 1 operably controlled by the usual mechanism of a glass machine (not shown); a blank or pattern mold 2 and the shearing mechanism generally indicated by the numeral 3.

The dip head, as it is frequently referred to, includes a slide section 4 vertically movable between supporting guide posts 5 which latter are mounted on the dipping head frame 6. A suitable means for imparting movement to the slide section 4 is arranged at the top thereof, and as shown consists of a bell crank lever 7 pivotally supported in a bracket 8. One end of the lever 7 is connected to the end of a link 9, the other end of said link being connected at 10 to the slide section 4. An operating rod 11 is attached to the opposite end of the bell crank lever, said rod being interconnected with the operating mechanism of the machine. It will be understood that various other means may be used to impart movement to the slide section.

The blank mold 2 is supported upon an arm 12 extending from and movable with the slide 4. The separable blank mold sections 13 and 14 are of the usual construction each being supported in the respective arms 15 and 16, which latter are pivotally mounted at 17 upon the arm 12. Each arm 15 and 16 is formed with an extension arranged to project either through or around the dipping head frame 6 and connect with suitable operating mechanism carried by the glass machine as will be understood.

The usual clamping screws 18 and leveling screws 19 are provided on each mold section for properly positioning said sections in the respective lower supporting portions 20 and 21 of the arms 15 and 16.

The foregoing mechanism is shown and described as generally constituting that portion of an "Owens" bottle machine to which the present invention is applicable. The type of "Owens" machine for which my improved shearing mechanism has been primarily designed, comprises a rotary traveling frame carrying a plurality of the blank molds 2 moved successively into operative relation with a pool of glass, and means including a differential pressure or vacuum for sucking the molten glass through an opening in the blank mold. Associated neck and finishing molds are provided for further shaping the blank or pattern, as will be understood. When the glass is drawn into the blank mold, to form the pattern from which the product or article is to made, a string or neck of the molten glass connects the same with the molten glass in the pool or tank. The means for severing this string or neck of glass so as to prevent the formation of a shear mark or scar will now be described.

A shearing blade 22 provided with a cutting edge 23 is mounted upon a movable arm 24. The blade is formed of suitable cutting steel and is detachably secured to the arm 24. A supporting rod 25 is secured at its lower end to the arm 24 by means of a connecting device 26 through which passes a set screw 27 adapted to engage the rod 25 and to also permit of the adjustment of the aforesaid blade arm 24 upon the supporting rod. A key prevents the rotation of the device upon the rod 25. The connecting device 26 is formed with a slotted extension 28 arranged to fit over the end of the arm 24, overhanging side flanges 29 being provided on the extension 28 for rigidly securing the supporting rod and blade together. A screw 30 joins the connecting device to the blade arm, the top of said screw serving as a limiting means to prevent the shearing blade from striking the mold as it moves beneath the same for severing the glass.

The supporting rod 25 is vertically movable through the bearing bracket 31 projecting from an arm 32 secured to the dipping frame 6. A lever 33 having a forked end 34 arranged to straddle trunnions 35 serves to elevate and lower the supporting rod, and in turn the shearing blade, as will more fully hereinafter appear. The upper end of the rod 25 is threaded as at 36 and an adjusting wheel nut 37 is positioned thereon for purposes of vertically adjusting the shearing blade.

The lever 33 is pivoted at 38 to the arm 32 and one end of an actuating rod 39 is connected to the arm 40 of the lever, the other arm of the rod 39 being interconnected with and operably controlled by the mechanism of the glass machine.

The means for moving the shearing blade to sever the glass includes a relatively long gear 41 keyed to the supporting rod 25 and a rack bar 42 adapted to mesh with said gear. The rack bar is operatively controlled through an arm or rod 43 interconnected with the machine, the said shearing blade being swung in timed relation with a cooperating shear plate 44 and an associated operating mechanism now to be described.

Figure 1:
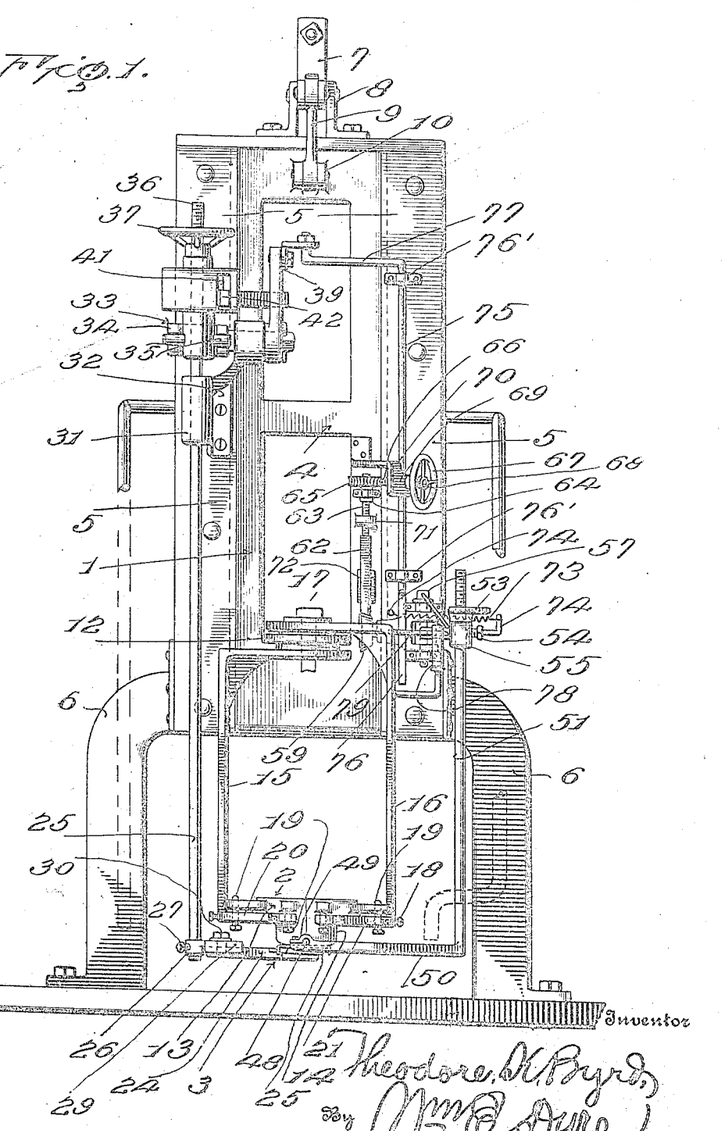
Fig. 1 is a front elevation of my invention as applied to a dipping head.
Figures 2, 10:
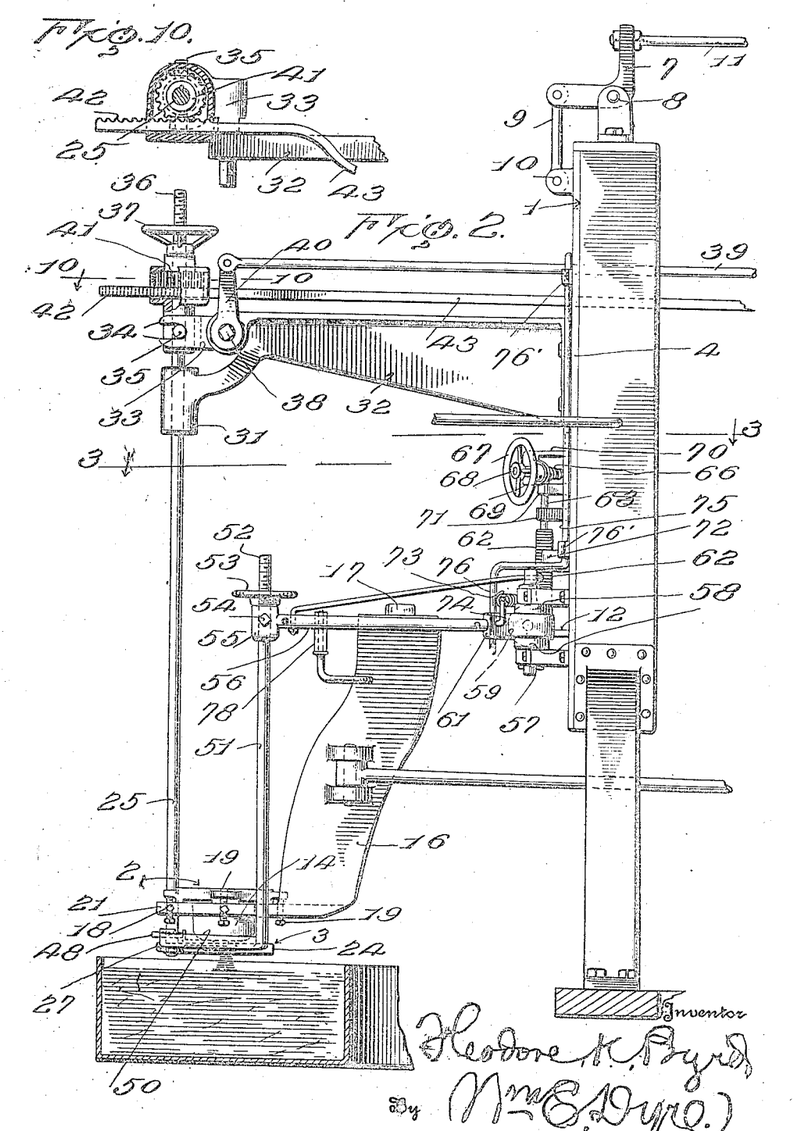
Fig. 2 is a view in side elevation showing a portion of a glass tank and the severed string or neck of glass lifted therefrom.
Fig. 10 is a detail horizontal sectional view on the line 10—10 of Fig. 2.
Figures 3, 4, 5:
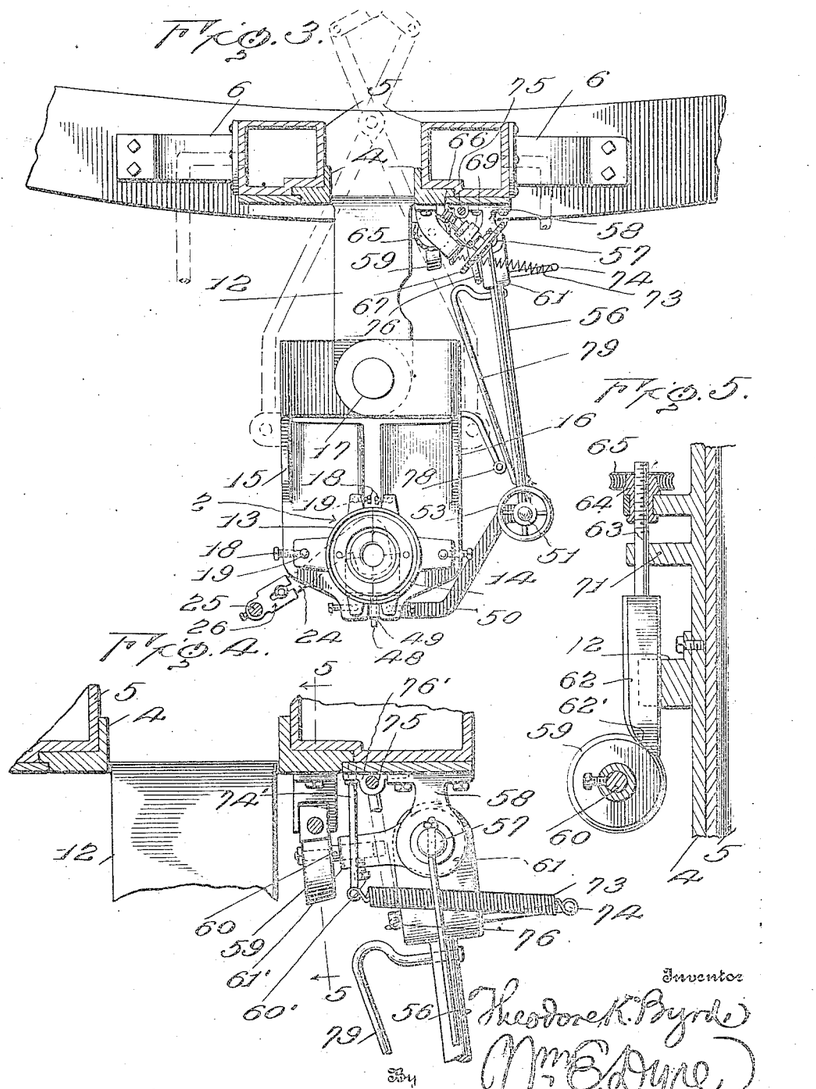
Fig. 3 is a horizontal sectional view on the line 3—3 of Fig. 2.
Fig. 4 is a similar fragmentary sectional view on an enlarged scale of the cam and roller for swinging the shear plate from under the blank mold.
Fig. 5 is a detail vertical sectional view on the line 5—5 of Fig. 4, of the aforesaid cam and roller connection.
Figure 6:
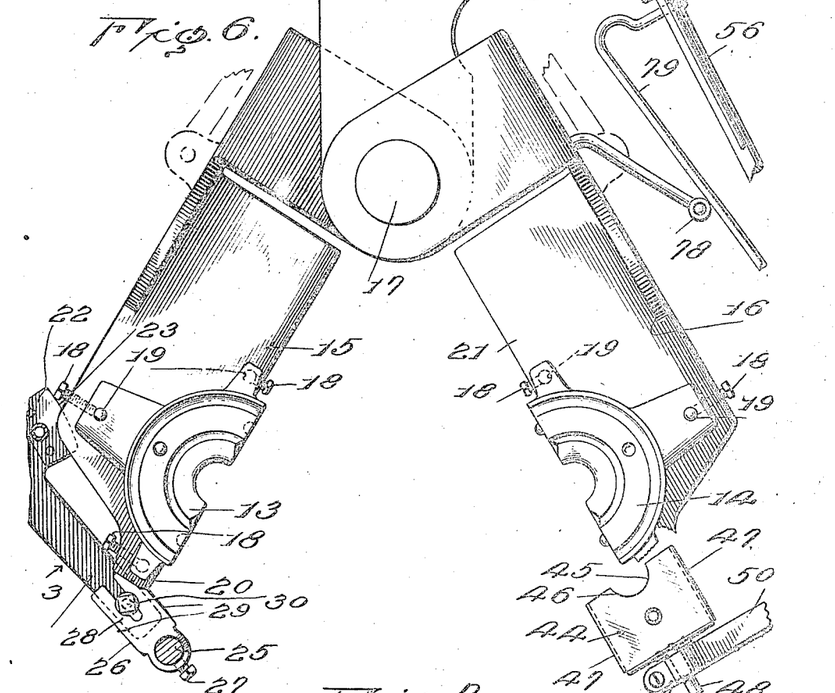
Fig. 6 is an enlarged detail plan view of the blank molds in separated or open position, illustrating the relative positions of the respective shearing blade and shear plate.
Figure 7:
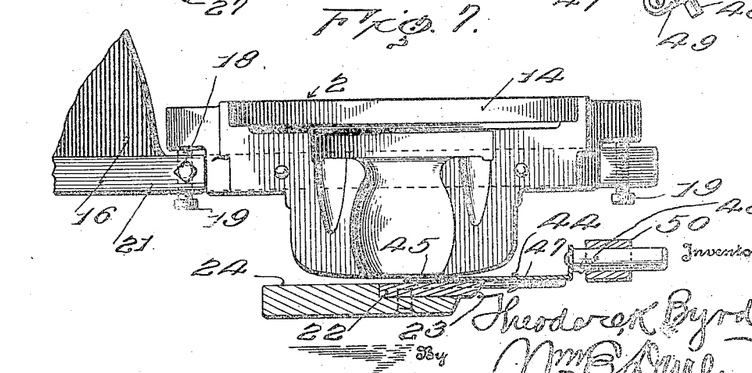
Fig. 7 is a vertical sectional view through the blank mold and associated shearing members, the shearing blade having moved under the shear plate for severing the glass.
Figures 8, 9:
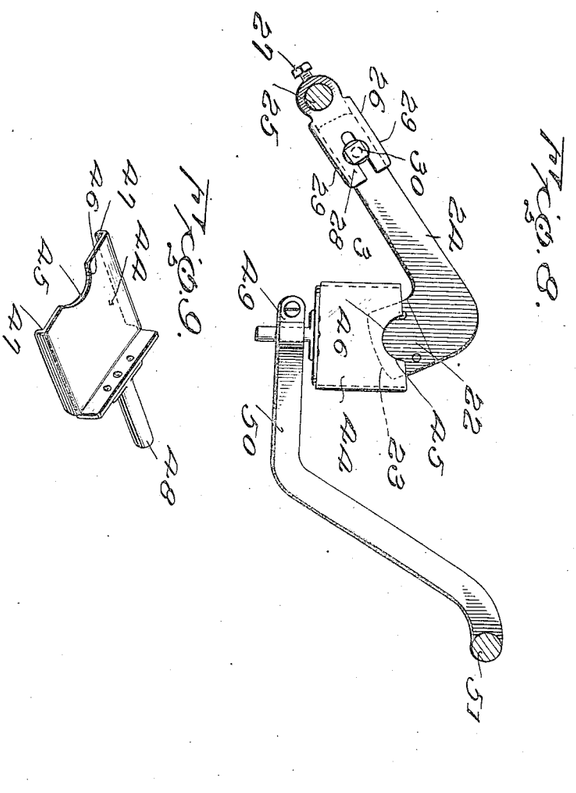
Fig. 8 is a detail plan view of the complementary shearing members shown as having severed the glass.
Fig. 9 is a detail perspective view of the shear plate.

The shear plate 44 is formed of relatively thin material and is provided with a cutting edge 45, cooperatively associated with the cutting edge of the shearing blade. The shear plate 44 is movably associated with the bottom of the blank mold and more particularly one section thereof, and during the glass cutting operation remains substantially stationary. A curved portion 46 substantially conforming to the contour of a portion of the glass opening in the mold blank is provided on the shear plate 44, and in practice it is usual to bring this curved edge into substantially a registering position with the side of the glass opening in the mold blank, as illustrated in Figs. 7 and 8. The shear plate is moved beneath the blank mold and serves as substantially the substitute shearing edge of one side of the blank mold opening which heretofore has been used. It will be understood, however, that the position of the shear plate beneath the bottom of the blank mold and with relation to the opening therein may be varied. When moved toward the center, for example, the relatively inconspicuous shear mark or scar is more or less obliterated, and when the glass is severed at substantially the edge of the blank mold opening the shear mark or scar is likewise imperceptible to all intents and purposes.

The structural features of the shear plate may be varied, but as shown it is formed of a relatively thin, flat plate having depending strengthening flanges 47. A shank 48 extends from the shear plate and is adjustably clamped at 49 in the end of a supporting arm 50. A vertical post 51 supports the arm 50, and a vertical adjusting device is provided at the upper end of said post. The threaded end 52 of the post 51 and a nut 53 comprise the said adjusting device.

The post 51 is held by a set screw 54 in a sleeve 55 provided on the end of the bracket 56. The bracket 56 is pivotally mounted on the pin or stud 57 and between lugs 58 extending from the guides 5 of the dipping frame.

A conical roller 59 is carried by a stud 60, and is adjustably mounted by means of a set screw 60' in a sleeve 61' projecting from the head section 61 of the bracket. The roller 59 is cooperatively associated with a cam 62 carried by the sliding section 4 of the dipping head.

The cam 62 is vertically adjustable upon the slide section 4 by means of the screw threaded shank 63 operable through a revoluble nut 64 which latter is provided with a worm gear 65. A worm 66 is arranged to mesh with the worm gear 65 and an operating wheel 67 is provided for turning the worm. The worm 66 may be carried by a shaft 68 mounted in a bearing 69 provided on the supporting bracket 70. When the hand wheel 67 is revolved the worm transmits motion through the worm gear 65 and nut 64 to the shank 63 of the cam 62, thereby causing the cam end 62' thereof to bear against the roller 59 and in turn position or set the shear plate 44 with respect to the opening in the bottom of the blank mold. The adjustment of the roller 59 and cam 62 also permits of the use of different size blank molds, as well as providing a take-up means for the wear of same.

A bearing 71 and guide shoe 72 extend from the slide section 4 and maintain the cam 62 in its adjusted position with respect to the roller 59 when the said slide section is lowered for swinging the shear plate clear of the blank mold. A spring 73 having one end connected to the pin 74 on the bracket 56, and the other end attached to the pin 74' projecting from the slide section 4, is provided for keeping the roller in yielding contact with the cam 62, and in turn position the shear plate 44 with respect to the opening in the bottom of the blank mold.

The means for swinging the bracket arm 56 and associated shear plate 44 away from the blank mold and independent of the movement of the slide section 4 of the dipping head comprises a depending rod 75 having a lower extension 76 adapted to bear against the head portion 61 of the bracket 56. The rod 75 is rotatably mounted in bearings 76' secured to the guide member 5, and is provided at its upper end with an extending arm 77, the end of which is operably connected to the actuating rod 39 hereinbefore referred to as controlling the vertical movement of the shearing blade. From this construction it will be seen that upon lowering the shearing blade, the bracket arm 56 is partially swung outwardly thereby carrying the shear plate 44 clear of the bottom of the blank mold. Upon the opening of the blank mold and the movement of the section 16 thereof, a roller 78 carried by said section strikes a guide track 79 and the bracket arm 56 is picked up and moved to its outermost position to permit of the operation of the other mechanism of the machine.

In operation, the dipping head is lowered with the blank mold sections closed to permit gathering of the glass. The shear plate 44 is moved back by this operation, the cam 62 bearing against the roller 59 and swinging the bracket 56 outwardly. The shearing blade 22 is clear of the blank mold from the preceding operation of the device As the dipping head moves upwardly the shearing block is also operated by the rack bar 42 rotating the gear 41, thereby causing the arm 24 to swing inwardly under the bottom of the mold and engage the neck or string of glass which is severed between the relatively fixed edge 45 of the shear plate 44 and the moving cutting edge 23 of the shearing blade 22.

When the glass is severed the shearing blade is lowered by means of the rod 39, rocking the lever 33 and moving the supporting post 25 downwardly. At the same time the extension 77 connected to the rod 39 causes the rod 75 to rotate and the lower end 76 thereof to strike against the bracket 61 and move the same a short distance clear of the bottom of the blank mold. The shearing blade is now moved outwardly in its lowered plane by means of the reverse movement of the rack bar 42 and gear 41. The opening of the blank mold now causes the section 16 thereof to pick up the bracket 56 through the roller 78 and track 79, thereby moving the shear plate 44 to its outermost position.

The aforesaid lowering of the shearing blade and initial movement of the shearing plate permits of a sufficient clearance between the cutting devices and the bottom of the blank mold so that the separating sections of the latter can partially open without interference. With the cutting devices and blank mold sections in extended position the finishing mold can be moved against the pattern or blank, the latter being supported by the neck molds as will be understood.

After the bottle is completed, the blank mold sections begin to close, and the shearing blade is moved vertically and returned to its normal cutting plane, the shearing plate being returned by the action of the spring 72 as the blank mold section 16 moves inwardly.

The shearing blade remains in its lifted but outermost position for the next cutting operation. The shearing plate, however, moves outwardly again when the dip head is lowered to gather another batch or gob of glass.

Figure 11:
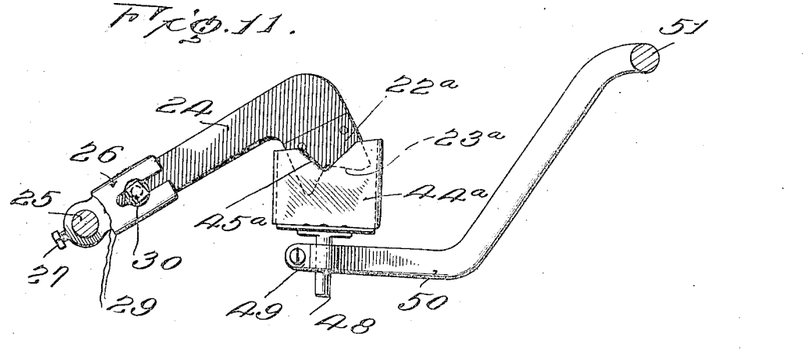
Fig. 11 is a detail plan view of a modified form of complementary shearing members.

In the modified form shown in Fig. 11, the shearing blade 22ª is provided with an angular or forked cutting edge 23ª, and the shearing plate 44ª may be suitably formed with an angular or forked shearing edge 45ª. By this construction the shear mark or scar is rendered particularly inconspicuous or entirely obliterated, and the location of the cut-off point if it appears at all in the product, can be determined by adjusting the relatively fixed shear plate and co-operating moving shearing blade, as will be understood.

Various changes lying within the scope of my invention may be made and I do not limit myself to the exact disclosure herein set forth.

I claim:

1. The combination with a glass gathering device of a mold for the gathered glass, and means for severing the string or neck of glass extending from the mold, said means including a shearing blade, a co-operating relatively thin shearing plate movable beneath one side portion of said mold adjacent the neck of glass extending through the opening in the mold, and means for moving the aforesaid shearing blade through the neck of glass and across the aforesaid shearing plate, the latter remaining stationary adjacent one side of said opening in the mold.

2. The combination with a glass gathering device of a mold for the gathered glass, and means for severing the string or neck of glass extending from the mold, said means including a relatively stationary shearing member positioned in close proximity to the mold and adjacent the neck of glass and movable with respect to said mold, and a cutting blade movable through said glass toward the aforesaid shearing member.

3. The combination with a glass gathering device of a mold for the gathered glass, and means for severing the string or neck of glass extending from the mold, said means including a shearing member positioned substantially against the mold against the neck of glass and movable with respect to said mold, and a cutting member movable through said glass toward the shearing member.

4. The combination with a glass gathering device of a mold for the gathered glass, and means for severing the string or neck of glass extending from the mold, said means including a shearing member positioned substantially against the bottom of said mold adjacent the neck of glass and movable with respect to said mold, means for adjusting said shearing member, and a cutting device movable through said glass and toward the aforesaid shearing member.

5. The combination with a glass gathering device of a mold for the gathered glass, and means for severing the string or neck of glass extending from the mold, said means including a relatively thin shearing member positioned substantially against the mold and the extending neck of glass, said shearing member being movable with respect to said mold and a cutting member movable through the glass toward the aforesaid thin shearing member.

6. The combination with a glass gathering device of a mold for the gathered glass, and means for severing the string or neck of glass extending from the mold, said means including a relatively thin and stationary shearing plate arranged adjacent the mold and neck of glass and movable with respect to said mold, and a shearing blade movable through the neck of glass and across the edge of the aforesaid shearing plate.

7. The combination with a glass gathering device of a mold for the gathered glass, means including complementary shearing devices for severing the neck of glass extending from the mold, means for moving one of said shearing devices beneath a portion of said mold to a point adjacent one side of the opening in the mold, and means for moving the other of said devices beneath the remaining portion of said mold, and toward the aforesaid shearing device to sever the neck of glass, one of said shearing devices remaining stationary at one side of the opening in the mold during the shearing operation.

8. The combination with a glass gathering device of a mold for the gathered glass, means including complementary shearing devices for severing the neck of glass extending from the mold, means for moving said shearing devices independently of each other beneath the relative portions of the mold, and means for lowering one of said shearing devices from out of the cutting plane after the cutting operation.

9. The combination with a glass gathering device of a mold for the gathered glass, means including complementary shearing devices for severing the neck of glass extending from the mold, means for moving said shearing devices independently of each other beneath the relative portions of the mold, means for moving one of said shearing devices out of the cutting plane after the glass is severed, and means for moving the other of said shearing devices from beneath the mold.

10. The combination with a glass gathering device of a mold for the gathered glass, means including complementary shearing devices for severing the neck of glass extending from the mold, means for moving said shearing devices independently of each other beneath the relative portions of the mold, means for lowering one of said shearing devices out of the cutting plane after the glass is severed, and means for horizontally swinging both of said complementary shearing devices from beneath the mold.

11. The combination with a glass gathering device including a movable dip head of a mold comprising separable sections, means including a shearing blade for severing the neck of glass extending from beneath the mold, a shear plate positioned beneath the mold and cooperatively associated with the shearing blade, and means including the aforesaid dip head for moving the aforesaid shearing device from beneath the mold when the sections comprising the latter are in closed position and lowered into the molten glass for gathering same.

12. The combination with a glass gathering device including a movable dip head of a mold comprising separable sections, means including a shearing blade for severing the neck of glass extending from beneath the mold, a shear plate positioned beneath the mold and cooperatively associated with the shearing blade, means provided on said dip head for moving the shear plate from beneath the closed mold when the mold sections are lowered to gather the molten glass, and means for returning the shear plate to its operative position beneath the mold.

13. The combination with a glass gathering device including a movable dip head of a mold comprising separable sections, means including a shearing blade for severing the neck of glass extending from beneath the mold, a shear plate positioned beneath the mold and cooperatively associated with the shearing blade, means including a cam carried by said dip head for moving the shear plate from beneath the mold when the closed sections of the latter are lowered for gathering the molten glass, and a spring for returning the shear plate to operative position beneath the mold.

14. The combination with a glass gathering device including a movable dip head of a mold comprising separable sections, means including a shearing blade for severing the neck of glass extending from beneath the mold, a shear plate positioned beneath the mold and cooperatively associated with the shearing blade, means provided on said dip head for moving the shear plate from beneath the mold when the closed sections of the latter are lowered to gather the molten glass, an adjusting device for said means adapted to regulate the position of said shear plate beneath the mold, and means for returning the shear plate to operative position beneath the mold.

15. The combination with a glass gathering device including a movable dip head of a mold comprising separable sections, means including a shearing blade for severing the neck of glass extending from beneath the mold, a shear plate positioned beneath the mold and cooperatively associated with the shearing blade, a pivoted bracket for said shear plate, a roller carried by said bracket, a cam provided on the dip head, and cooperatively associated with said roller, and means including a spring for keeping the roller in operative contact with the aforesaid cam whereby the shear plate is moved to inoperative and operative position when the dip head is lowered and raised respectively.

16. The combination with a glass gathering device including a movable dip head of a mold comprising separable sections, means including a shearing blade for severing the neck of glass extending from beneath the mold, a shear plate positioned beneath the mold and cooperatively associated with the shearing blade, a pivoted support for said shear plate, means including an adjustable roller and associated cam for moving the shear plate from beneath the closed mold when gathering molten glass the sections of the latter open, and means for returning the shear plate to its operative position beneath the mold.

17. The combination with a glass gathering device including a movable dip head of a mold comprising separable sections, means including a shearing blade for severing the neck of glass extending from beneath the mold, a shear plate positioned beneath the mold and cooperatively associated with the shearing blade, means provided on the dip head for moving the shear plate from beneath the mold, and means including one of the mold sections for moving the said shear plate when the sections of said mold separate.

18. The combination with a glass gathering device including a movable dip head of a mold comprising separable sections, means including a shearing blade for severing the neck of glass extending from beneath the mold, a shear plate positioned beneath the mold and cooperatively associated with the shearing blade, means provided on the dip head for moving the shear plate from beneath the mold, means including one of the mold sections for swinging the shear plate clear of the dipping head when the sections of said mold separate, and means for returning the shear plate to its operative position beneath the mold.

19. The combination with a glass gathering device of a mold for the gathered glass, and means for severing the neck or string of glass extending from the mold, said means including a shearing blade having an angular or forked cutting edge, a cooperatively associated shearing plate movable to a point adjacent one side of the mold opening and having an angular or forked shearing edge, means for positioning said shearing plate with relation to the neck of glass, and means for moving the shearing blade toward the shearing edge of the aforesaid positioned shearing plate, the latter remaining stationary during the shearing operation.

In testimony whereof I affix my signature, in presence of two subscribing witnesses.

THEODORE K. BYRD.

Witnesses:
  HELGE MURRAY,
  JAMES H. MARR.